United States Patent [19]

Speer

[11] Patent Number: 4,510,001
[45] Date of Patent: Apr. 9, 1985

[54] MULTIPLE FILLING METHOD OF REPAIRING DAMAGED MATERIAL

[76] Inventor: Lawrence L. Speer, 436 Hopocan Ave., Barberton, Ohio 43203

[21] Appl. No.: 531,174

[22] Filed: Sep. 8, 1983

[51] Int. Cl.³ .............................................. B32B 35/00
[52] U.S. Cl. ...................................... 156/98; 264/36; 427/140; 428/63
[58] Field of Search .................... 156/94, 98, 267; 264/36; 427/140; 428/63

[56] References Cited

U.S. PATENT DOCUMENTS

| | | | |
|---|---|---|---|
| 3,620,865 | 11/1971 | Golumbic | 156/98 |
| 3,804,685 | 4/1974 | Jacoby et al. | 156/98 |
| 3,810,801 | 5/1974 | Speer | 427/140 X |
| 4,028,160 | 6/1977 | Golumbic | 156/98 |
| 4,260,439 | 4/1981 | Speer | 156/98 |
| 4,283,240 | 8/1981 | Speer | 156/98 |
| 4,419,162 | 12/1983 | Fischer | 427/140 X |

Primary Examiner—Robert Dawson
Attorney, Agent, or Firm—David D. Murray

[57] ABSTRACT

A vinyl repair compound and two step vinyl repair method provide an exceptionally strong and long wearing repair. The repair compound includes vinyl resins, a solvent, a plasticizer and silica filler, has a paste-like consistency and air dries. The repair process entails the following: trimming away the damaged material, placing backing material behind the damaged area if necessary, filling the repair area flush with the surface of the surrounding material with the repair compound and allowing it to air dry. Due to shrinkage of the compound as it dries, a depression is formed which is then filled with a conventional heat curable plastisol vinyl repair compound. If necessary, smooth or grained release paper is placed over the repair area, heat is applied to cure the plastisol compound and the repair is allowed to cool.

11 Claims, 8 Drawing Figures

MULTIPLE FILLING METHOD OF REPAIRING DAMAGED MATERIAL

BACKGROUND OF THE INVENTION

The invention relates generally to a compound and method for repairing damaged plastic and leather articles and more specifically to a vinyl repair compound and two step vinyl repair method for repairing damaged plastic, vinyl, and other similar materials utilized in chairs, automobiles, sofas and other furniture as well as personal articles of apparel such as shoes, boots, coats and purses.

Plastic materials such as vinyl have been widely accepted for use as a covering for furniture, automobile seats and tops, luggage, purses, boots and many miscellaneous items relating to household and personal apparel. Among the advantages of vinyl and similar plastic materials are its imperviousness to water, its ability to remain flexible over a broad range of temperatures and the wide variety of colors and finishes in which it is readily produced. When compared to natural hide material such as leather, vinyl materials exhibit significantly more uniform color and thickness which eliminates costly and time-consuming matching and piecing, are generally more tear-resistant and, of course, are significantly less expensive.

Perhaps the most significant use of vinyl materials is as an upholstery fabric on furniture and automobile seating areas. Since in such service it will generally be used for an extended period of time, the likelihood of eventual damage is great. Such objects as automobile keys, pens, pencils and toys or heated objects such as matches or cigarettes are obvious causes of such damage. In spite of the fact that such damage may be confined to a small area, the area of the damage will frequently be in an exposed, highly visible region of the article. In spite of the high visibility of such damage, the expense of replacing the entire plastic panel containing the damage discourages most consumers from repairing the damage. Such damage thus goes unrepaired, either acting as the situs for tearing and further damage of the fabric, lowering the overall value of the article, or both.

I have devoted my life to developing materials and methods for effecting repairs on plastic and vinyl articles. For example, in 1973 I obtained U.S. Pat. No. 3,713,926 for a basic process for the in-situ repair of vinyl material. This process comprehends the filling of a damaged area with a heat curable material of 70% polyvinyl acetate and 30% plasticizer. A graining paper is placed over the patch and sufficient heat is applied to cure the repair compound. My invention disclosed and claimed in U.S. Pat. No. 3,887,413 teaches another, more sophisticated method of vinyl repair which includes the use of a protective paste which is dispersed on the surface of the undamaged material adjacent the damaged area. U.S. Pat. No. 3,975,558 also utilizes a heat insulating paste. A repair method utilizing a heat transfer tool is described in my U.S. Pat. No. 4,181,547 and a method for repairing grained or embossed vinyl sheeting with imprinted vinyl molds is disclosed in my U.S. Pat. No. 4,283,240. From the foregoing, it is apparent that I have expended substantial effort with relation to materials and processes directed to the repair of vinyl, leather and similar materials.

The field of vinyl repair is an expanding and increasingly sophisticated industry as evidenced by other patent activity. U.S. Pat. No. 4,013,495 relates to a method for repairing pigmented and textured flexible material wherein a plurality of thin layers of liquid vinyl repair compound are serially applied and heat cured. U.S. Pat. No. 4,028,160 describes another method wherein precured plastic material is cut into edge abutting patches and fused thereto. U.S. Pat. No. 4,086,113 uses precured patch material, as disclosed in the previous patent, in a preformed patch which is larger than the area of the damaged portion such that it overlaps the damage. The patches are fused to the surrounding undamaged material.

In spite of the innovation of myself and others, certain difficulties still exist. One of the most formidable areas of difficulty relates to the attainment of satisfactory curing and bonding of the repair material. This difficulty is the manifestation of a general problem relating to the proper application of heat. In the processes I have developed, it is frequently difficult to provide an appropriate quantity of heat to properly cure all of the vinyl repair compound in a large and therefore frequently thick repair area. If the vinyl repair compound has not properly cured, due to insufficient heat application, the service life of the patch will be reduced since the material will not achieve appropriate toughness and the bonding achieved with the adjacent material will be less than optimum which may result in separation of the patch material from the surrounding undamaged material. Excessive application of heat, while ensuring complete curing and bonding of the patch material, will invariably destroy the grain texture of the surrounding material or distort it. Clearly, those processes utilizing precured patch material are intended to alleviate the problems attendant insufficiently cured repair material. However, heat application then becomes an even more exacting process since insufficient heat will result in an insufficient bond between the patch and the surrounding material. Generous heat application such as may be frequently needed to achieve melting and bonding of the patch to the surrounding material may, unfortunately, result in damage to the grain and distortion of the material just as in processes where heat curing repair materials are utilized.

SUMMARY OF THE INVENTION

From the foregoing, it becomes apparent that improvements are possible and that a process which is capable of achieving a secure bond between the patch material and the surrounding undamaged material but which also required a minimum of heat application would be desirable. The instant invention responds to such need. It includes both a vinyl repair compound and two step vinyl repair process which overcomes many of the above-described shortcomings of previous repair approaches. The repair compound includes two vinyl resins, a solvent, a plasticizer and a silica filler. The compound is of a paste-like consistency which is air drying. The repair process comprehends the following steps: trimming away the damaged material to provide secure, undamaged edges to which the repair compound will adhere, placing a backing material behind the area to be repaired and filling the repair area with the repair compound flush with the surrounding material. Then the repair compound is allowed to air dry and in so doing shrinks and becomes slightly depressed from the adjacent surface. In the recess or depression formed by the shrinkage of the first repair compound, a conventional heat curable plastisol repair compound is filled in, again flush with the level of the surrounding material. The plastisol may be tinted or colored to match the color of the surrounding material. If grain on the repair is necessary, graining paper of the appropriate texture is placed over the repair area and heat is applied to cure the plastisol compound. If heat is supplied by a heat tool but no grain is desired, a smooth release paper may be applied over the repair area but if no grain is needed and the heat is supplied by a hot air tool, no paper is necessary. When the patch is cool, the graining paper, if used, may be removed. A strong, secure repair which is well bonded to the surrounding material has thus been achieved.

It is thus the object of the instant invention to provide a vinyl repair compound which bonds securely to the surrounding undamaged material.

It is a further object of the instant invention to provide a vinyl repair compound which does not require the application of heat in order for it to cure, but rather, is air drying.

It is a further object of the instant invention to provide a method of vinyl repair generally utilizing a first air drying vinyl repair compound and a second, heat curable vinyl repair compound.

It is a still further object of the instant invention to provide a method of vinyl repair which requires less heat application than prior art methods and thus reduces the likelihood of damage to the surrounding material.

Further objects and advantages of the instant invention will become apparent by reference to the following description of the preferred embodiment and appended drawings.

DESCRIPTION OF THE PREFERRED EMBODIMENT

Figure 1:
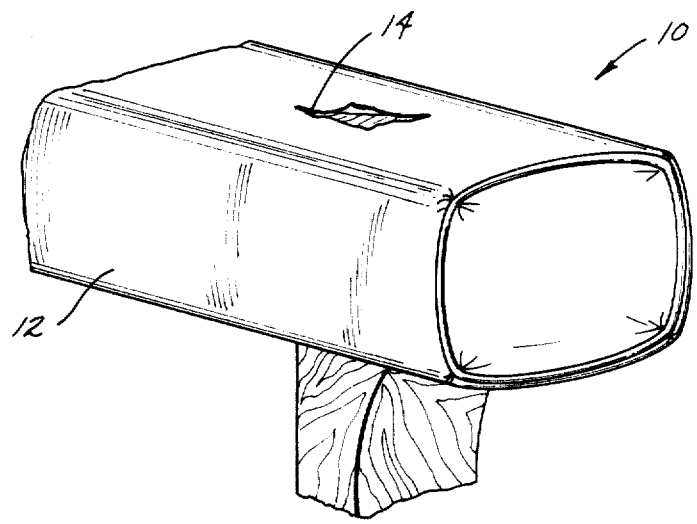
FIG. 1 is a fragmentary, perspective view of a chair arm covered with a leather, vinyl or plastic material which has been damaged.
Figure 2:
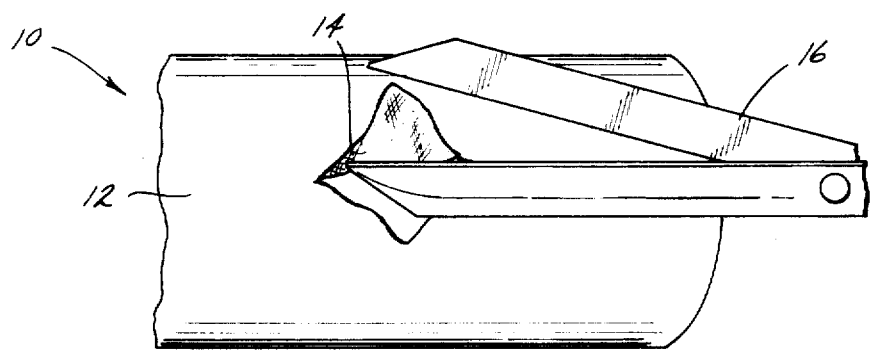
FIG. 2 is a top plan view of a damaged chair arm undergoing the first step of the repair process, that is, trimming away of the damaged material.

Referring now to FIGS. 1 and 2, an arm portion of an arm chair or similar article of furniture which has sustained damage is illustrated and generally designated by the reference numeral 10. The arm 10 is covered with a leather or man-made upholstery material 12 such as plastic, vinyl or the like. A damaged area 14 appears on the upper surface of the arm 10. It should, of course, be understood that the arm 10 is used herein for explanatory and illustrative purposes, and that any item covered by any plastic, vinyl, vinyl-like, synthetic or leather material is amenable to repair by the instant method and composition of matter. Whether the damaged area 14 is large or small, the first step of the repair process comprehends the cutting away and removal of any torn, ripped or generally unsecure portion of the material 12 by the use of scissors 16 or similar sharp cutting tool which will provide a secure, uniform edge which is defined only by undamaged material.

Figure 3:
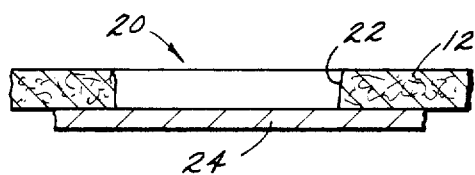
FIG. 3 is a fragmentary, full sectional view of the repair area with backing material in place.

Referring now to FIG. 3, subsequent to the removal of all damaged material around the damaged area 14, a clean repair cavity or area 20 having an undamaged and structurally sound edge 22 has been created. Depending upon the size of the repair area 20, and also upon the degree of support offered by the subsurface structure of the article, it may be either necessary or advantageous to place a patch of backing material 24 underneath the upholstery material 12. The backing material 24 should be larger in overall area than the size of the repair area 20 in order to provide full subsurface support for the repair. Generally speaking, if the repair area is less than about one-half inch in diameter and is properly supported from behind, the backing material 24 is unnecessary. However, if the structure of the article behind the repair area 20 is also damaged, or will for any reason not provide proper support to the repair, it is always preferable to utilize the backing material 24.

Figure 4:
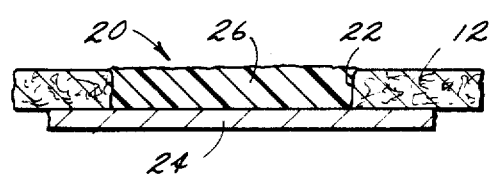
FIG. 4 is a fragmentary, full sectional view of the repair area wherein the repair area has been filled flush with the level of the adjacent surface with the air drying vinyl repair compound of the instant invention.

Referring now to FIG. 4, the next step of the repair process is to fill the repair area 20 with air drying repair compound 26 of a composition to be described subsequently. The repair compound 26 is preferably carefully applied to the repair area 20 with a spatula or similar tool such that all regions within the repair area 20 and particularly those adjacent the edge 22 are filled with the repair compound 26. The repair cavity or area 20 is preferably filled completely with the repair compound 26 to a level which is flush with the level of the surrounding undamaged material 12. The repair compound 26 is then permitted to completely air dry.

Figure 5:
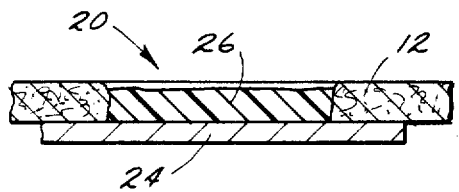
FIG. 5 is a fragmentary, full sectional view of the repair area in which the repair compound has air dried and shrunk.

Referring now to FIG. 5, it will be appreciated that due to the volatile substances within the repair compound 26, as it air dries, it will undergo dimensional reduction. Subsequent to complete air drying, the repair compound then will be at a level somewhat below the surface level of the surrounding material 12 as illustrated.

Figure 6:
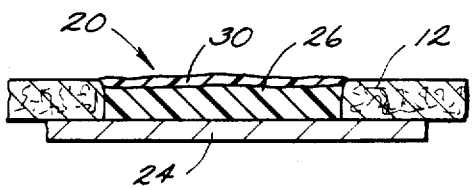
FIG. 6 is a fragmentary, full sectional view of the repair area wherein a layer of heat curable repair compound has been applied to the air drying repair compound within the repair area flush with the level of the adjacent surface.

Referring now to FIG. 6, the depression which was created by the shrinkage accompanying the air drying of the repair compound 26 is next filled with a conventional heat curable plastisol vinyl repair compound 30. Once again, the repair cavity or area 20 is filled flush with the level of the surrounding material 12. It should be understood that appropriate coloring pigment or pigments may and should be added to the plastisol vinyl repair compound 30 prior to its application within the repair area 20 such that a color match with the material 12 is achieved. The heat curable vinyl repair compound 30 is preferably a plastisol compound which is well known in the prior vinyl repair art and which is more fully described my above-referenced issued United States patents.

Figure 7:
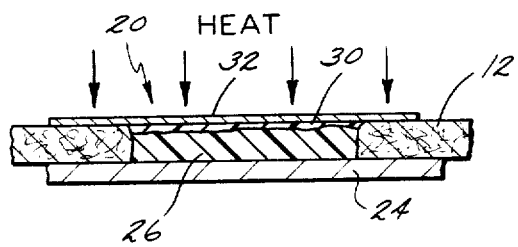
FIG. 7 is a fragmentary, full sectional view of the repair area wherein a surface treating paper has been applied to the repair area and heat is being applied.
Figure 8:
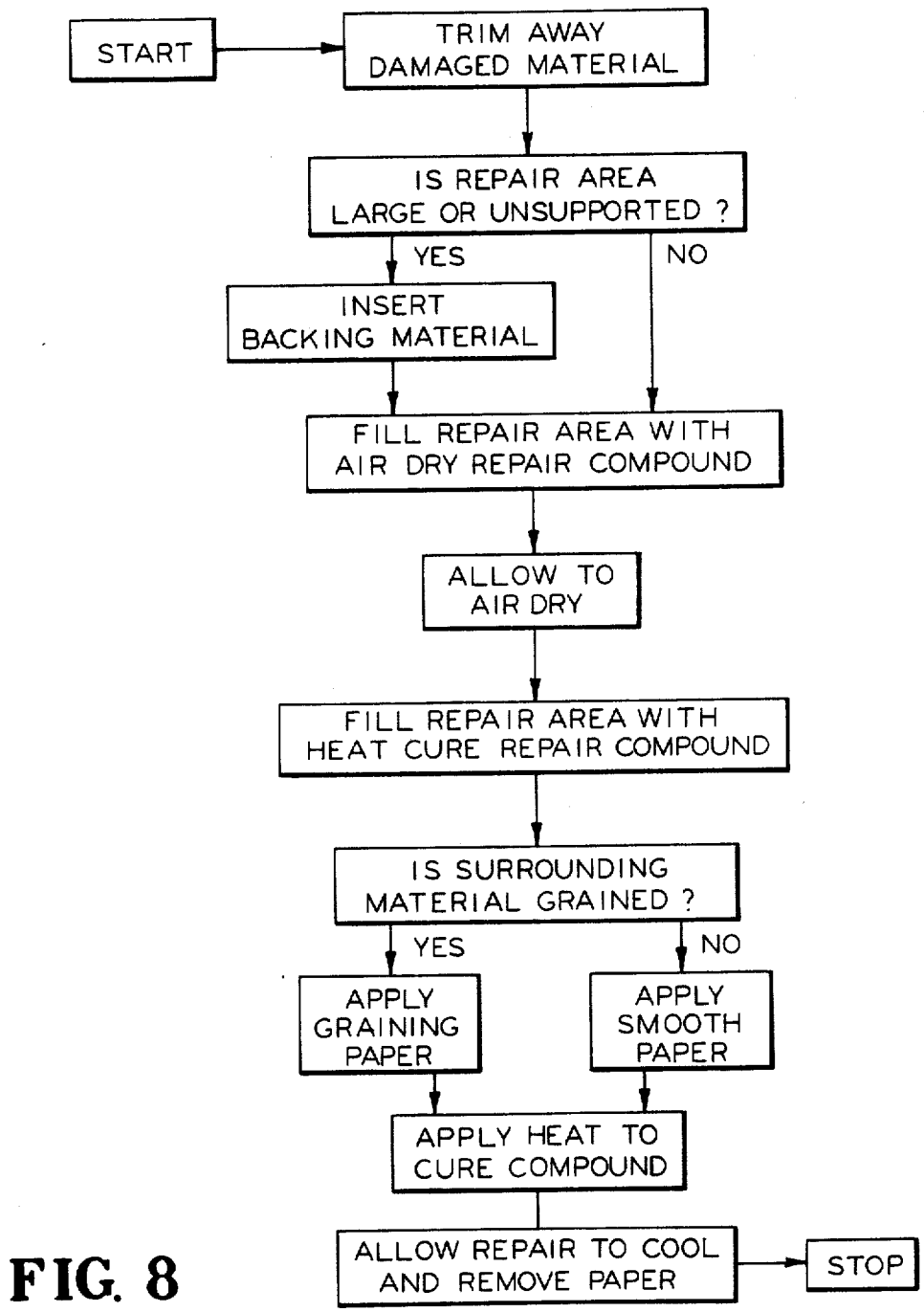
FIG. 8 is a flow chart generally diagramming the various steps of the instant repair method.

FIG. 7 relates to the final steps of the repair process. Generally speaking, they relate to the curing of the vinyl repair compound 30 and surface treatment of the repair compound 30 to provide a surface finish equivalent or similar to the surface finish of the material 12. If the surface of the material 12 is smooth, a smooth release paper 32 may be applied over the repair area 20 if heat is to be applied by direct application such as through the use of a heated repair tool. If the surface of the surrounding material 12 is smooth but heat is to be applied through the use of a device supplying a stream of hot air, no release paper 32 need be applied to the repair area 20. Alternatively, if the surrounding material is grained and the repair area 20 must likewise include a grained surface in order to properly match it, a suitably textured grained release paper 32 must be placed over the repair area and, if possible, registered with like features of the grain of the surrounding material 12. Heat is then applied to cure the heat curable plastisol vinyl repair compound 30 according to conventional practices which could include, the use of a heat gun, Micro Heat Beam Hot air tool, heated iron (different sizes and tips) as well as the heat transfer tool described in my U.S. Pat. No. 4,181,547. When sufficient heat has been applied to completely cure the repair compound 30, the heat source is removed and the compounds within the repair area 20 are allowed to cool. Finally, the smooth or grained release paper 32 is removed, thus completing the repair process.

It should be readily appreciated that this new vinyl repair process provides significantly improved results over prior art processes since only a relatively small proportion of the repair is constituted of a heat curable repair compound. Due to this small amount of heat curable heat repair compound, a minimal quantity of heat need be applied to the repair area 20, significantly reducing the possibility of damage to the surrounding undamaged material 12.

The air drying vinyl repair compound 26 is of a new and unique composition which tightly bonds to the edges 22 of the repair area 20 to form a rugged and highly serviceable repair and base for the repair compound 30 but which does not require the heat curing of many prior art vinyl repair compounds and the attendant possibility of damage to the surrounding material 12. Ranges of constituents of the air drying vinyl repair compound 26 are given below in Table I and the preferred composition of the compound 26 is given below in Table II.

TABLE I

| RANGES | |
|---|---|
| VYNS Vinyl Resin | 20-30% |
| VMCH Vinyl Resin | 20-30% |
| MIBK Solvent | 25-35% |
| Cabosil Silica Filler | 10-20% |
| 711 Plasticizer | 2-5% |

TABLE II

| PREFERRED COMPOSITION | |
|---|---|
| VYNS Vinyl Resin | 26% |
| VMCH Vinyl Resin | 26% |
| MIBK Solvent | 30% |
| Cabosil Silica Filler | 15% |
| 711 Plasticizer | 3% |

The vinyl resins VYNS and VMCH are dry powders which are manufactured by the Union Carbide Company. These vinyl resin powders are combined with the MIBK (methylisobutylketone) solvent which is a product of the Shell Chemical Company. These materials are combined with the Cabosil silica filler which is a product of the Cabot Chemical Company and the 711 plasticizer which is a product of the Monsanto Company. The air drying vinyl repair compound according to this composition has the viscosity of a soft paste which permits it to be readily disposed within a repair area 20. Furthermore, the compound 26 is translucent and without appreciable color. Therefore, the layer of repair compound 30 which will generally include color pigment to match the surrounding material 12 need not be thick inasmuch as the air dry repair compound 26 can be readily covered due to its lack of significant color.

It will be apparent that the foregoing process and composition of matter may be readily and expeditiously utilized to perform rapid and rugged repairs to damaged vinyl, plastic, leather and other similar upholstery and covering materials. Due to the small quantum of heat necessary to cure only the plastisol repair compound layer, the possibility of damage to the surrounding, undamaged vinyl material is minimized if not eliminated.

The foregoing disclosure is the best mode deviced by the inventor for practicing this invention. It is apparent, however, that processes and compositions of matter incorporating modifications and variations will be obvious to one skilled in the art of material repair. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of repairing damaged vinyl and other material comprising the steps of:
    trimming away damaged material to form a repair area in the undamaged material,
    substantially filling said repair area with an air drying repair compound,
    allowing said repair compound to air dry,
    applying a layer of heat curable repair compound over said air drying repair compound, and
    applying heat to said heat curable repair compound to cure said compound.

2. The vinyl repair method of claim 1 further including the step of placing backing material behind said repair area.

3. The vinyl repair method of claim 1 further including the step of placing backing material behind said repair area before filling said repair area with said air drying repair compound.

4. The vinyl repair method of claim 1 further including the step of placing a release paper over the repair area prior to applying heat to said repair area.

5. The vinyl repair method of claim 1 wherein a grained release paper is placed over said repair area prior to curing said curable repair compound.

6. The vinyl repair method of claim 1 wherein said repair area is filled flush with the surface of said undamaged material with said repair compound.

7. The vinyl repair method of claim 1 further including the steps of applying a release paper over said repair area prior to applying heat and permitting said repair compound to cool prior to moving said release paper.

8. A method of repairing vinyl and similar materials comprising the steps of:

trimming away damaged material to create an undamaged repair area, filling said repair area flush with the surface of said surrounding material with an air drying repair compound, allowing said repair compound to dry, filling said repair area flush with the surface of said surrounding material with a heat curable plastisol repair compound, and applying heat to said plastisol repair compound to cure said compound.

9. The repair method of claim 8 further including the step of placing backing material behind said repair area.

10. The repair method of claim 8 further including the step of applying a release paper over the repair area prior to applying heat to said area.

11. The repair method of claim 8 wherein said air drying repair compound shrinks as it air dries and forms a depression in which said plastisol repair compound is placed.

* * * * *